United States Patent [19]

Micali et al.

[11] Patent Number: 5,016,274
[45] Date of Patent: May 14, 1991

[54] ON-LINE/OFF-LINE DIGITAL SIGNING

[76] Inventors: Silvio Micali, 224 Upland Rd., Cambridge, Mass. 02140; Oded Goldreich, 19 Ben Gurion, Tel Aviv; Shimon Even, 13 Vitkin Street, Haifa, both of Israel

[21] Appl. No.: 268,803

[22] Filed: Nov. 8, 1988

[51] Int. Cl.$^5$ ............................................. H04L 9/30
[52] U.S. Cl. ..................................... 380/23; 380/24; 380/29; 380/30; 380/50; 235/379; 235/380; 340/825.31; 340/825.34
[58] Field of Search .................. 364/200, 900, 222.5, 364/224.21, 260.81, 260.9, 286.4, 286.5, 918.7, 943.7, 944.5; 380/23-25, 30, 49, 50, 29; 235/379, 380, 382; 340/825.31, 825.34

[56] References Cited

U.S. PATENT DOCUMENTS

| | | | |
|---|---|---|---|
| 4,326,098 | 4/1982 | Bouricius et al. | 380/25 |
| 4,453,074 | 6/1984 | Weinstein | 235/380 |
| 4,549,075 | 10/1985 | Saada et al. | 235/380 |
| 4,590,470 | 5/1986 | Koenig | 380/23 |
| 4,656,474 | 4/1987 | Mollier et al. | 380/23 |
| 4,800,590 | 1/1989 | Vaughan | 380/25 |
| 4,816,655 | 3/1989 | Musyck et al. | 235/380 |
| 4,825,050 | 4/1989 | Griffith et al. | 235/379 |
| 4,879,747 | 11/1989 | Leighton et al. | 380/23 |
| 4,910,774 | 3/1990 | Barakat | 380/23 |

FOREIGN PATENT DOCUMENTS

| | | | |
|---|---|---|---|
| 0077238 | 4/1983 | European Pat. Off. | 380/23 |
| 0231702 | 8/1987 | European Pat. Off. | 380/23 |
| 0002445 | 1/1986 | Japan | 380/23 |

OTHER PUBLICATIONS

A Method for Obtaining Digital Signatures and Public-Key Cryptosystems, by: R. L. Rivest, A. Shamir, & L. Adleman, Feb. 1978.
Digitalized Signatures and Public-Key Functions as Intractable as Factorization, by: Michael O. Rabin, Jul. 23, 1979.
How to Prove Yourself: Practical Solutions to Identification and Signature Problems, by: Amos Fiat and Adi Shamir.
An Improvement of the Fiat-Shamir Identification and Signature Scheme, by: Silvio Micali & Adi Shamir, Aug. 1988.
A Digital Signature Based on a Conventional Encryption Function, by: Ralph C. Merkle.
A Digital Signature Scheme Secure Against Adaptive Chosen-Message Attacks, by: Shafi Goldwasser, Silvio Micali & Ronald L. Rivest, Jun. 12, 1987.
How to Sign Given Any Trapdoor Function, by: Mihir Bellare & Silvio Micali.
Digitalized Signatures, by: Michael O. Rabin, Jul. 1976.

*Primary Examiner*—Stephen C. Buczinski
*Assistant Examiner*—Bernarr Earl Gregory
*Attorney, Agent, or Firm*—David H. Judson

[57] ABSTRACT

A method for "on-line/off-line" digital signing is described and begins by pre-computing a data string x from a pair of matching public and secret keys of a digital signature scheme such that, for any message m later selected to be signed, a signature of m derived from x can be computed substantially faster than the signature of m derived from the matching public and secret keys. After a message m is selected to be signed, the method computes a signature $\sigma$ of the message m using the data string x. Because the method uses a two-stage approach to sign a message, the technique can be advantageously used to enhance the security of known digital signature schemes or to effect transaction processing using "smart" cards.

33 Claims, 3 Drawing Sheets

ON-LINE/OFF-LINE DIGITAL SIGNING

TECHNICAL FIELD

The present invention relates generally to message encoding techniques and more Particularly to a new technique for generating digital signatures which enhances the security and the efficiency of known signature schemes

BACKGROUND OF THE INVENTION

Digital signature schemes are well-known in the prior art. In a conventional signature scheme, each user Publishes a public key while keeping a secret key. The user's signature for a message m is a value o which can be efficiently computed with knowledge of the secret key and then verified by anyone using only the known public key. It is hard to forge the user's signature, however, without knowledge of the secret key. One such digital signature scheme is the so-called Rabin scheme wherein a user U publishes a composite number $n_U$, a product of 2 primes, as his public key, and keeps $n_u$'s prime factorization as his secret key. The signature of a message (an integer between 1 and $n_U$ and relatively prime with $n_U$) is then computed. If m is a square modulo $n_U$, then its signature is $\sigma = \sqrt{m} \bmod n_U$. If m is not a square, its signature is a pair (r, s) where $\sigma = \sqrt{m \cdot r} \bmod n_U$ and r is a few-bit random number, so that m·r is a square mod $n_U$. In Rabin's scheme, as in all currently known digital signature schemes, signing is feasible, though not always efficient, when the length of the public and secret keys are large.

It is also known in the prior art that of the various kinds of attacks that can be mounted by a forger against a signature scheme, the most general is an adaptive chosen plaintext attack. In this type of attack, the forger uses the signer to obtain sample signatures of messages of the forger's choice. The forger's choices are made dependent on the public key and on signatures returned by the user in response to the forger's previous requests. The knowledge gained by the forger can then be used to forge a signature of a message not previously signed or, at worst, to determine the secret key itself. Rabin's scheme, described above, is totally unsecure against an adaptive chosen plaintext attack.

In many applications; e.g., using an so-called "smart⇌ or intelligent card to effect commercial transactions, it would be desirable and necessary to be able to generate a digital signature immediately after a message has been chosen. However, because all currently-available signature schemes only compute the signature after selection of the message, digital signing techniques are not presently useful for such real-time applications. One method to overcome this problem would be to use more efficient computational techniques, however, such techniques are prohibitively expensive. Alternatively, the signer must be willing to compute and store the signature of all possible messages before the signing of individual messages takes place. This approach is also impractical.

It would therefore be desirable to have a new approach to digital signing which overcomes these and other problems associated with prior art techniques.

BRIEF SUMMARY OF THE INVENTION

It is an object of the present invention to describe a novel digital signature technique wherein some portion of the message signing routine is carried out "off-line," namely, before the message itself has been chosen.

It is a further object of the invention to provide a method that transforms any ordinary digital signature scheme to one that exploits off-line pre-processing to thereby strengthen the scheme against a chosen plaintext attack.

It is yet another object of the present invention to provide a digital signature schemes in which the signing of a message is broken into two phases. The first or "off-line" phase requires a moderate amount of computation but it presents the advantage that it can be performed leisurely, before the message to be signed is known. Because the message to be signed is not yet chosen, such a computation is, in effect, a "generic" one. The second phase is the so-called "on-line" phase which starts after the message is known and, by cleverly utilizing the "generic computation" of the off-line phase, is much faster than prior art approaches.

It is still a further object of the invention to provide a method for transforming a known digital signature scheme in such a manner that the transformed scheme is invulnerable to chosen plaintext attack even if the underlying scheme is not.

These and other objects of the invention are provided in a method for enabling a single signer to generate a digital signature of a message using first and second digital signature schemes, each of the digital signature schemes having a key generation algorithm for generating a pair of matching public and secret keys, a signing algorithm which uses the pair of matching public and secret keys to produce a signature with respect to the public key, and a verification algorithm for determining whether the signature produced by the signing algorithm is valid with respect to the public key. Generally, the method comprises two (2) basic steps: (a) computing a signature $\Sigma$ of the public key pk of the first digital signature scheme using the signing algorithm S of the second digital signature scheme, and (b) computing a signature $\sigma$ of the message using the signing algorithm s of the first digital signature scheme to generate a digital signature of the message "m", the digital signature comprising a data string $\Sigma, \sigma$).

Preferably, the first digital signature scheme is a so-called "one-time" scheme which is essentially guaranteed to be secure as long as it is used to sign substantially no more than one message. Therefore, as each new message is selected for signing, preferably a new one-time digital signature scheme is used. Moreover, if desired the signer may enrich (i.e., add to) and/or hash (i.e., decrease the length of) the public key pk and/or the message to create an "enriched" and/or "hashed" public key or message in connection with performing the signature computations. For example, the signer can enrich the message with a data string (comprising the public key pk, a hashed version of the public key pk, a hashed version of the public key pk enriched with a data string, the signature $\Sigma$, data identifying the signer, data identifying the date of signing, other data or no data) to create an enriched message. Thereafter, the signer may also apply a predetermined differentiating function H to the enriched message prior to computing the signature $\sigma$. Likewise, the signer may enrich the public key with a data string to create an enriched public key prior to computing the signature $\Sigma$.

In another method of the invention, a signer runs the key generation algorithm g of a preferably one-time digital signature scheme to generate a plurality of public keys and their associated secret keys. The signer then computes a signature Σ of the plurality of public keys of the first digital signature scheme using the signing algorithm S of the second digital signature scheme. A data string, comprising a pre-computed signature which includes the signature Σ of the plurality of public keys of the first digital signature scheme, is then stored to complete an "off-line" phase. After a message m is selected to be signed, the signer uses a predetermined differentiating function H to map the message into a data string H(m) and then computes a signature σ of the data string H(m) with respect to one of the public keys pk of the first digital signature scheme using the signing algorithm s of the first digital signature scheme. The "on-line" phase is completed by compiling a data string (Σ,σ) representing a signature of the message m. To increase the speed of the off-line phase, the signer may hash the plurality of public keys prior to computing the signature Σ. If so, the data string representing the signature of the message will include the plurality of public keys or other data to enable verification.

In accordance with yet a further feature of the invention, a method is described for enhancing the security of a known digital signature scheme which may be subject to an adaptive chosen plaintext attack, the known digital signature scheme having a key generation algorithm G for generating a pair of matching public and secret keys (PK,SK), a signing algorithm S which uses the pair of matching public and secret keys to produce a signature with respect to the public key PK, and a verification algorithm V for determining whether the signature produced by the signing algorithm is valid with respect to the public key PK. According to this method, a key generation algorithm g of a one-time digital signature scheme is run to generate a one-time public key pk and its associated one-time secret key sk. This step is equivalent to the signer selecting a one-time secret key and then computing the matching one-time public key therefrom. Thereafter, the method computes a signature Σ of the public key pk of the one-time digital signature scheme using the signing algorithm S of the known digital signature scheme. A pre-computed signature, which includes at least the signature Σ of the public key pk of the one-time digital signature scheme, or sufficient data to quickly compute it, is then compiled and stored. This completes a so-called "off-line" phase of the method. In the "on-line" phase, a message m to be signed is selected. Then, a predetermined differentiating function H is used to map the message into an enriched message, and a signature σ of the enriched message is computed using the signing algorithm s of the one-time digital signature scheme. To complete the on-line phase, the signer compiles a data string (Σ,σ) representing a signature of the message m.

In another embodiment of the invention, a method for on-line/off-line digital signing begins by pre-computing a data string x from a pair of matching public and secret keys of a digital signature scheme such that, for any message m later selected to be signed, a signature of m derived from x can be computed substantially faster than the signature of m derived from the matching public and secret keys. After a message is selected to be signed, the method computes a signature σ of the message using the data string x. The Pre-computation and signature computation steps may be carried out by the same signer or by different signers.

Because the on-line phase preferably uses a "one-time" digital signature scheme, a further feature of the invention is the provision of a unique method for generating a one-time digital signature of a message ready to be signed. This method begins by selecting a predetermined one-way function f and generating k randomly-selected input strings as a one-time secret key, where the number of input strings k is less than the length n of the message m. Thereafter, the signer applies the one-way function f to the input strings of the one-time secret key to generate a one-time public key corresponding to the one-time secret key. To complete the scheme, the signer then applies the one-way function f to the input strings of the secret key a predetermined number of times x, where x is polynomial in n, to generate a one-time signature of the message relative to the one-time public key.

The on-line/off-line digital signature scheme is useful for a number of practical applications. One such application is transaction processing using an "intelligent" credit card or the like. In accordance with a further feature of the invention, a system for allowing authorized users of intelligent cards to effect transactions via at least one transaction terminal is also described. This system includes a plurality of intelligent cards, a loading terminal, and at least one transaction terminal. Each of the cards has a memory for storing a data string x pre-computed (by the loading terminal) from a pair of matching public and secret keys of a digital signature scheme such that, for any message m later selected to be signed, a signature of m derived from x can be computed substantially faster than the signature of m derived from the matching public and secret keys. Each card further includes means for computing a signature σ of the message m using the data string x. The transaction terminal preferably includes means for receiving a card inserted into the transaction terminal, means for communicating with the card inserted into the terminal and means for receiving the signature σ of the message m computed by the card. Alternatively, the transaction terminal may communicate with the card over a communications channel such as a telephone line which may be made cryptographically secure if desired.

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

Similar reference characters refer to similar steps throughout the several methods shown in the drawings.

DETAILED DESCRIPTION

A prior art digital signature scheme generally has the following components:
* An efficient key generation algorithm G which can be used by any user U to produce a pair (PK, SK) of matching public and secret keys; stated differently, a method for selecting a secret key and computing a matching public key therefrom.
* An efficient signing algorithm S which, given a message m and a pair (PK,SK) of matching public and secret keys, produces a signature s of m with respect to PK.
* An efficient verification algorithm V which, given s, m, and PK, tests whether s is a valid signature for the message m with respect to the public key PK.

Such prior art schemes are enhanced according to the invention by preprocessing in a so-called on-line/off-line manner. In particular, an on-line/off-line digital signature scheme is one in which the signing of a message is broken into two phases. The first phase is "off-line". While the off-line phase requires a reasonable amount of computation, it presents the advantage that it can be performed leisurely, before the message to be signed is known. As the message to be signed is not yet chosen, such a computation is in effect a "generic" one. The second phase is "on-line". It starts after the message is known and, by cleverly utilizing the "generic computation" of the off-line phase, is much faster than prior art approaches.

In the preferred embodiment of the invention, efficient on-line/off-line signature schemes generally combine three main ingredients: an efficient (conventional) signature scheme, an efficient differentiating function, and an efficient one-time signature scheme. The first ingredient has been described above. Regarding the second ingredient, preferably the differentiating function is a hashing function H. A function is differentiating if it is essentially impossible to find two messages that are mapped to the same value. A one-time signature scheme is a signature scheme which is essentially guaranteed to be secure as long as it is used only once; i.e., to sign one message only. This means that an adversary (who does not know the secret key) cannot forge the signature of a message by just looking at the public key and one previously-signed message.

Figure 1:
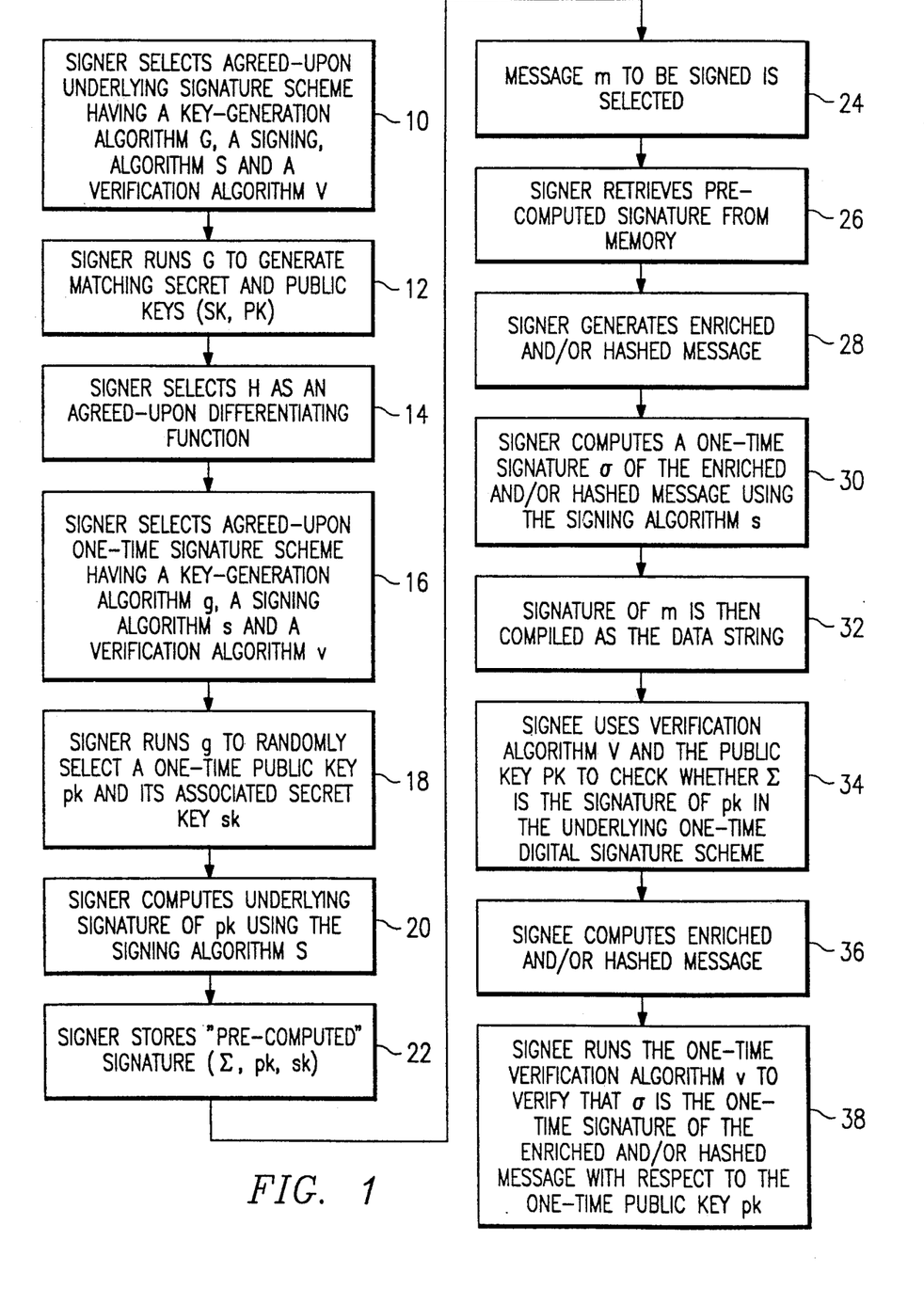
FIG. 1 is a flowchart of an on-line/off-line digital signature scheme according to the present invention.

Referring now to FIG. 1, a method for digital signing begins at step 10 wherein the signer selects an agreed-upon underlying signature scheme having a key-generation algorithm G, a signing algorithm S, and a verification algorithm V. The underlying digital signature scheme can be any of a plurality of known signature schemes such as the Rivest, Shamir and Adleman (RSA) scheme. At step 12, the signer runs G to signer keeps the matching secret key, SK, for itself. At step 14, the signer selects H as an agreed upon differentiating function which maps arbitrarily long messages to n-bit long strings. For example, but not by way of limitation, H can be a differentiating hashing function or the identity function. At step 16, the signer selects an agreed-upon one-time signature scheme having an agreed-upon one-time key-generation algorithm g, a one-time signing algorithm s, and a one-time verification algorithm v.

The order of steps 10-16 can, of course, be modified by the signer in any convenient manner. Likewise, the signer may group one or more steps into a single step.

Before any message m has been chosen, the signer runs algorithm g at step 18 to randomly select a one-time public key pk and its associated secret key sk for one-time signing a n-bit string. At step 20, the signer computes the underlying signature of pk using the signing algorithm S:

$$\Sigma = S(pk, PK, SK).$$

Alternatively, the signer may use a predetermined differentiating function to "enrich" (i.e., add to) and/or "hash" (i.e., decrease the length of) the public key pk to create an enriched and/or hashed public key prior to computing the signature $\Sigma$ at step 20. At step 22, the signer stores a "pre-computed signature" ($\Sigma$,pk,sk) in a suitable storage area. The pre-computed signature represents a data string having a special property. In particular, for any message "m" later selected to be signed, the signature of the data string can be computed substantially faster than the signature of m derived from the matching public and secret keys. Steps 10-22 represent a so-called "off-line" phase of the method. Thereafter, an "on-line" phase is initiated whenever a message m to be signed is selected at step 24.

At step 26, the signer proceeds to retrieve the pre-computed signature from memory. At step 28, the signer may use a predetermined differentiating function to either "enrich" and/or "hash" the message to create an "enriched" and/or "hashed" message. For example, if this function is the identity function, step 28 leaves the message intact. If the signer desires to modify the message, however, it can hash the message to reduce its size and/or it can enrich the message with a data string (e.g., the public key pk, a hashed version of the public key pk, a hashed version of an enriched public key pk, the signature $\Sigma$, data identifying the signer, data identifying the date of signing, other data or no data) to create the hashed and/or enriched message.

To complete the on-line phase, the signer continues at step 30 by computing a one-time signature o of the hashed and/or enriched message H(m) using the signing algorithm s:

$$\sigma = s(H(m), pk, sk).$$

The signature of m is then compiled at step 32 as the data string ($\Sigma,\sigma$). If the signature of m cannot be derived from $\sigma$, the data string compiled at step 32 must include the public key pk as well.

To verify the signature, the signee uses verification algorithm V and the public key PK at step 34 to check whether $\Sigma$ is indeed the signature of pk in the underlying one-time digital signature scheme. If so, the method continues at step 36 where the signee computes the hashed or enriched message as the case may be. At step 38, the signee runs the one-time verification algorithm v to verify that $\sigma$ is the one-time signature of the hashed or enriched message with respect to the one-time public key pk. If so, verification is complete.

The method of FIG. 1 is highly advantageous because a forger cannot make good use of a chosen plaintext attack against the underlying signature scheme, even if one exists. In fact, for any message that the forger may choose to have signed, the underlying signature scheme will only be used to sign an independently-selected and essentially random message, i.e., pk. The forger also cannot mount a chosen plaintext attack against the one-time scheme since the method preferably uses a one-time public key only once and the scheme is secure if only one message is to be signed.

Moreover, a forger cannot easily attack the resulting combined scheme. Assume an adversary (who does not know the proper secret key) wants to forge the signature of a message m' never signed before. If he wants to use the same one-time public key pk used by the legal signer in the signature $(\Sigma,\sigma)$ of a previous message m, then he should be able to compute the one-time signature (with respect to pk) of H(m'). But if H for example is a differentiating hashing function, H(m') is a different string than H(m). Thus, given that the legal signer uses pk only once for one-time signing the string H(m), and given that the one-time signature scheme is secure, neither o is a valid signature for H(m') nor can the adversary compute such a valid signature. Also, if the adversary first chooses a one-time public key pk' (never used by the legal signer before) together with its one-time secret key to compute the one-time signature of H(m'), he will be unable to later conventionally sign pk' since the underlying conventional scheme is secure.

In its basic version, the off-line computation described above does not use the underlying scheme to sign "messages," but rather the string "pk". Stated differently, the basic method uses the underlying signature scheme purely as a mathematical function mapping strings to strings (or numbers to numbers). Neither the message nor anything dependent on the message is fed to the underlying signing function. The one-time public key is itself selected prior to selecting the message. Furthermore, the effort required by the on-line phase is negligible with respect to that of computing a conventional signature.

In an alternate embodiment of the method set forth in FIG. 1, step 18 is modified such that algorithm g randomly selects a plurality of one-time public keys and their associated secret keys. Step 20 is then modified to compute a signature $\Sigma$ of the plurality of public keys using the signing algorithm S. Step 30 is also modified to reflect that the signature $\sigma$ is computed with respect to one of the public keys. In this manner, a different public key pk (and therefore a different one-time signature scheme) is used for each message (or each group of messages) to be signed.

If the plurality of one-time public keys are too long, they can be hashed using a differentiating function prior to being signed. In particular, the signer selects a fixed o differentiating function H' and generates and signs a data string $H'(pk_1,pk_2...pk_n)$. Step 30 of FIG. 1 would then also be modified to compute the signature $\sigma$ of the enriched and/or hashed message. In this embodiment, the data string representing the signature of the message includes the plurality of public keys or other data to facilitate verification.

The disclosed scheme readily lends itself to several other variations. First, because the the differentiating function H is used primarily to avoid having two messages mapped to the same bit pattern, any number of such functions can be used by the signer. As discussed above, at step 28 of FIG. 1, the signer may hash m together with S instead of pk; alternatively, the signer may choose to hash m alone by computing H(m). In either case, step 30 of FIG. 1 would then be correspondingly changed to reflect computation of the signature $\sigma$ of the mapped message $H(m,\Sigma)$ or H(m) as the case may be. Moreover, as noted above the function H can receive other inputs such as all or part of the public key, the name of the signee or the current date. Any part of the differentiating function inputs or the final hashed value thereof can also be randomly perturbed.

As also discussed above, the signature $(\Sigma,\sigma)$ may contain more than the necessary information to verify a valid signature. Signatures can be made shorter by taking out this unnecessary information. For instance, the verifier can be Provided just a few bits to enable him to reconstruct and check the validity of the combined signature. Similarly, the length of the pre-computed signature $(\Sigma,pk,sk)$ can be shortened by only remembering $\Sigma$ and sk. This variation is especially useful for some one-time signature schemes where pk can be easily computed from sk.

Figure 2:
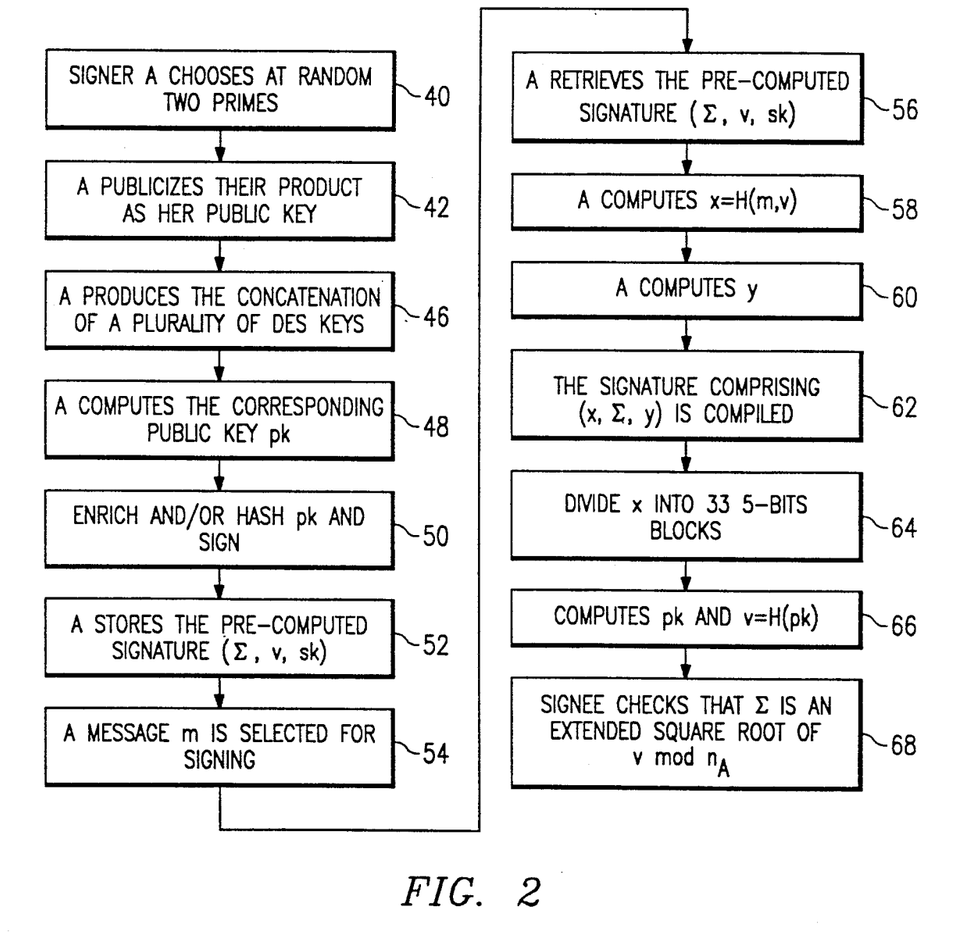
FIG. 2 is a detailed flowchart diagram showing the preferred embodiment of the on-line/off-line scheme of FIG. 1 in accordance with the present invention.

Referring now to FIG. 2, the preferred embodiment of the on-line/off-line digital signing method of the invention is shown. In this embodiment, a modification of Rabin's scheme is used as the underlying digital signature scheme, the well-known DES algorithm is used to build a one-time signature scheme, and DES is also used (in a standard way) as the differentiating hashing function.

For her underlying signature scheme, the signer A begins at step 40 by choosing at random two primes, one congruent to 3 mod 8 and the other congruent to 7 mod 8. A keeps the two Primes as her secret key and, at step 42, publicizes their product, $n_A$, as her public key. Preferably $n_A$ is at least 1024-bits long. Given this way of choosing the primes, for any integer v between 1 and $n_A$ and relatively prime with $n_A$, exactly one of the values in the set $S_v=\{v,-v \bmod n, 2v \bmod n, -2v \bmod n_A\}$ is a square modulo $n_A$. Moreover, each square mod n has exactly 4 distinct square roots mod $n_A$. The extended square root of v mod $n_A$ is defined to be a distinguished square root mod $n_A$ (say, the smallest one) of the appropriate member of $S_v$. By writing $\alpha = {}^{ext}\sqrt{v}$ mod $n_A$, $\alpha$ is the extended square root of v mod $n_A$. Such an $\alpha$ is easy to compute for the signer A as she knows $n_A$'s prime factorization and is as hard to compute as the factorization of $n_A$ for anyone else.

The signer may then sign a message m between 1 and $n_A$ and relatively prime with $n_A$ by computing $\alpha = {}^{ext}\sqrt{m}$. For m larger than $n_A$, as discussed above the signer might first properly reduce the message by computing H'(m) (where H' is a fixed, publicly available differentiating hashing function) and then compute its extended square root mod $n_A$. With overwhelming probability, this function is a randomly chosen integer between 1 and $n_A$ and is relatively prime with n. Anyone can verify that a is a legal signature of m by computing $a^2 \bmod n_A$ and then checking to see that it belongs to the set $S_m$.

In step 46, A uses her spare time to Produce the concatenation of a plurality of (e.g., 33) DES keys. Each key (56-bits long for standard DES) is chosen randomly. Thus, $$sk = K_1 K_2 \ldots K_{33}$$

will be a one-time secret key. At step 48, A computes the corresponding public key pk as follows:

$$pk = DES^{32}(M, K_1) \ldots DES^{32}(M, K_{33})$$

where M is a standard message, known to all. Here, $DES^x(\_,K)$ means iterating the DES function "x" times with the key K. A continues at step 50 by first hashing pk with a differentiating function to generate "v" and then signing the result. A can perform this task reasonably efficiently since she knows the two prime factors of $n_A$. Thus:

$$v = H(pk)$$

$$\Sigma = {}^{ext}\sqrt{v} \pmod{n_A}$$

At step 52, A stores the pre-computed signature ($\Sigma$,v,sk).

At step 54, a message m is selected for signing. At step 56, A retrieves the pre-computed signature ($\Sigma$,v,sk) from memory and then, at step 58, computes the 165-bit string:

$$x = H(m,v) = B_1 \ldots B_{33},$$

the concatenation of 33 blocks, each 5-bits long and thus an integer between 1 and 32. The function "H(m,v)" represents the result of applying the differentiating function H to the strings "m" and "v" together. At step 60, she computes the 2112-bit string:

$$y = y_i \ldots y_{32} y_{33},$$

where $$y_i = DES^{32-B_i}(M,K_i)$$

for $i = 1, \ldots, 32$ and $$y_{33} = DES^{1024-(B_1+\ldots B_{33})}(M,K_{33}).$$

This completes the signing process. At step 62 the signature comprising (x,$\Sigma$,y) is compiled. To verify the signature, the signee begins at step 64 by dividing x into 33 5-bits blocks, $$x = B_1 \ldots B_{32} B_{33},$$

and then, at step 66, computes $$pk = DES^{B_1}(M,y_1) \ldots DES^{B_{32}}(M,y_{32})DES^{B_1+\ldots+B_{32}(M,y_{33})},$$

$$v = H(pk).$$

At step 68, the signee checks that $\Sigma$ is an extended square root of v mod $n_A$; i.e., that $S^2 \bmod n_A$ is one of the four members of $S_v$. This completes the verification of the signature.

It should be appreciated by those skilled in the art that a number of variants are possible even in the preferred embodiment. For instance, and without intending to be exhaustive, rather than DES the signer can use another conventional cryptosystem. Also, M may not be a standard message used for all messages; for instance, it may be randomly selected in each off-line phase.

It should be appreciated that the methods described above with respect to FIGS. 1 and 2 are useful in many applications. One such application is for microprocessor-based or "smart" card technology wherein a credit card or the like includes an appropriate CPU and memory device on the card itself. Typically, the card is capable of autonomous computation. It can safely store some data and can safely communicate with external devices (e.g. via a card reader). The card is also capable of receiving and checking a personal identification number (PIN) or other type of password For the owner's protection, the card disables itself if, e.g., the wrong PIN is entered three consecutive times.

Figure 3:
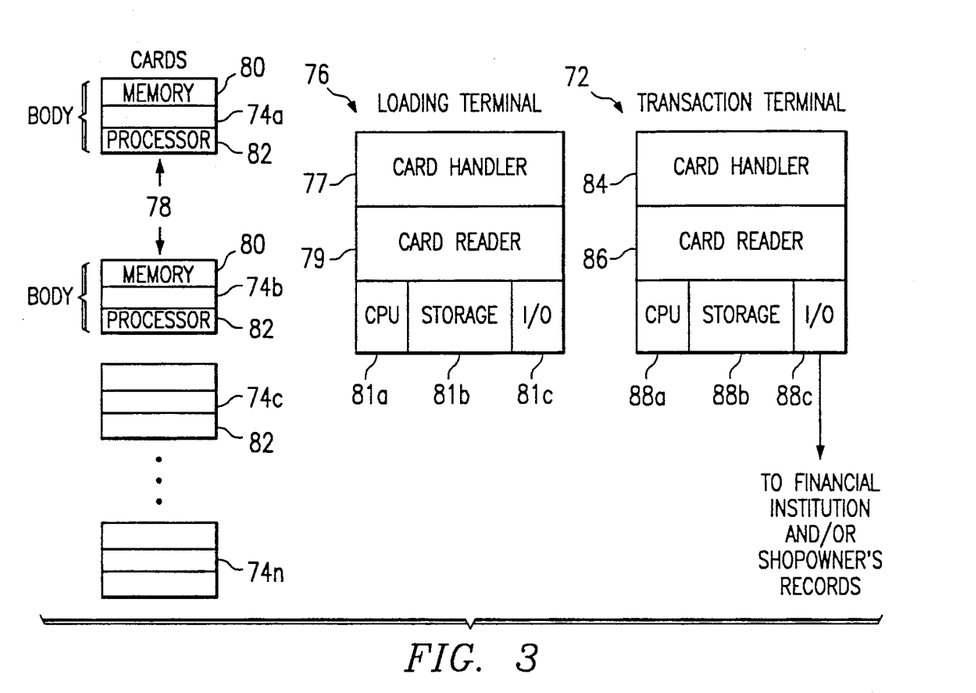
FIG. 3 is a schematic diagram of a transaction processing system according to the invention for use in effecting transactions by exploiting the on-line/off-line digital signing techniques of FIG. 1.

To incorporate the Principles of the present invention to smart cards, FIG. 3 discloses a system for allowing authorized users of intelligent cards to effect transactions via at least one transaction terminal 72. The system 70 also includes a plurality of intelligent cards 74a–74n and a loading terminal 76 for loading data into the cards. Each of the cards 74 has a body portion 78 on which is supported a memory 80. According to the invention, the loading terminal pre-computes a data string x from a pair of matching public and secret keys of a digital signature scheme and functions to store this data string in the memory 80 of a particular card 74. The data string pre-computed (in the off-line phase) by the loading terminal 76 has a unique property—for any message m later selected to be signed, a signature of m derived from x can be computed substantially faster than the signature of m derived from the matching public and secret keys of the digital signature scheme. Each card further preferably includes digital processing means 82 or the like for computing a signature $\sigma$ of the message m using the data string x.

The transaction terminal 72 preferably includes a card handler means 84 for receiving a card inserted into the transaction terminal, a card reader means 86 for communicating with the card inserted into the terminal and control means 88 for receiving the signature $\sigma$ of the message m computed by the card. The control means (which includes a CPU 88a, suitable storage 88b and input/output devices 88c, may also be used to formulate a message as will be described below. Alternatively, the transaction terminal 72 may communicate with a card 74 over a cryptographically-secure communications channel such as a telephone line.

In operation, the owner of the card uses the loading terminal 76 to perform the off-line pre-processing for the card; i.e., to compute a signature $\Sigma$ of the public key pk of a first digital signature scheme using the signing algorithm S of a second digital signature scheme and then to store the signature $\Sigma$ in the memory of an transaction card. As shown in FIG. 3, the loading terminal 76 preferably includes a card handler 77, a card reader 79, and a control means comprising CPU 81a, memory 81b and input/output devices 81c to facilitate these tasks. When the card communicates with the loading terminal 76 under a proper, safe protocol, the device can transfer to the card a number of pre-computed signatures, which the card safely stores inside its memory 80. Moreover, the smart card and the loading device need not be in Physical contact. The exchange of information between the card and the auxiliary device may be effected via a communication channel (e.g., a broadcasting channel, telephone lines, computer lines, etc.) protected by a safe cryptographic protocol if desired.

The pre-processed smart cards can then be used as a credit or debit card to effect commercial transaction. For example, assume a credit card company keeps the user's public key in a safe public file as long as the user pays his dues. Alternatively, the company may digitally sign the user's Public keY and give it to the user by storing it inside his card. A shopkeeper has the transaction terminal 74 capable of reading the proper public file and safely communicating with the cards. Under PIN protection, and using a safe communication protocol, the pre-processed card is inserted into the card handler of the terminal 74 and then controlled in the "on-line" manner to digitally sign a message "m" defining a record of a commercial transaction (e.g., the date, the merchandise sold, the price, and the name of the shop). The signed transaction message is then stored in the storage 88b of the transaction terminal and/or transmitted to the credit card or other financial institution.

A transaction processing system such as described above is highly advantageous to both the card owner and the shopkeeper. In particular, the card owner is protected (against false charges) because preferably his PIN must be entered (into the card or the transaction terminal) to sign any message representing a valid transaction. Likewise, the shopkeeper is protected because he receives the owner's digital signature which is both universally verifiable and unforgeable. The credit card company is also protected because a lost or stolen card cannot be used by an illegitimate user (who does not know the owner's proper PIN). Moreover, because the transaction does not require personal identification and verification, the card owner's privacy is protected and the transaction time is significantly reduced. Further, the scheme completely obviates carbon copies or other written documentation of the transaction.

Note that there is no need for the shopkeeper's transaction terminal to reach the credit card company in any way to look up the public key of the user. For instance, the credit card company may digitally sign the user's Public key, and this signature may be kept by the card and communicated to the transaction terminal.

The on-line/off-line signature scheme can also be used as an interactive identification scheme as follows. Using the preferred embodiment of FIG. 2, the signer chooses a 512-bit composite integer as the public key of the underlying signature scheme, with $n=24$, $k=8$, and $e=3$. In an off-line stage, the signer generates the pre-computed signature $(\Sigma, pk, sk)$. One then sends $\Sigma$ and pk a verifier. The verifier responds by sending back a randomly chosen 24-bit integer i. The sender then sends the one-time signature of i with respect to pk without any hashing. The verifier checks the underlying signature of pk and the one-time signature, $\Sigma$, of i with respect to pk. If both are valid the identification is considered successful.

Figure 4:
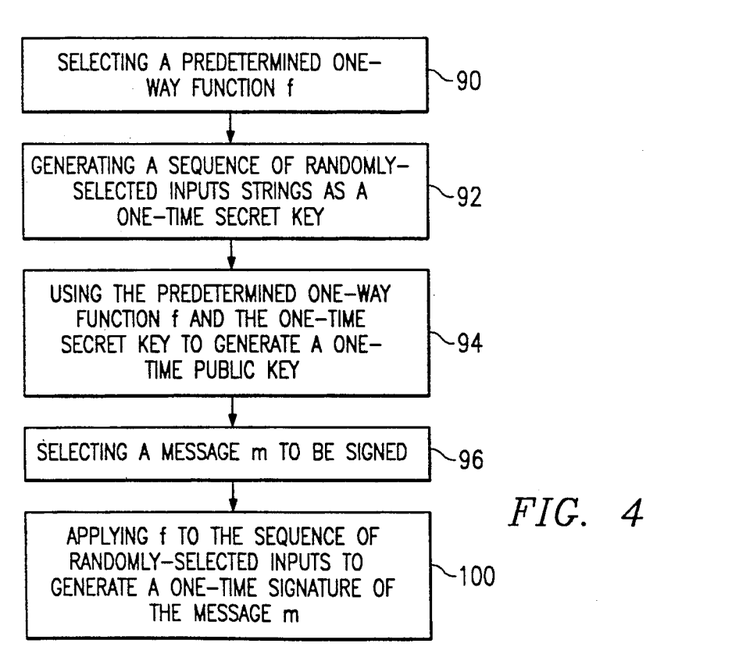
FIG. 4 is a flowchart diagram showing a preferred one-time signature scheme according to the teachings of the invention.

As noted above, one of the main ingredients of the disclosed method is a "one-time" digital signature scheme. Referring now to FIG. 4, a method for generating such one-time digital signatures is shown. At step 90, f, defined as a one-way function which can be composed with itself, is selected. The function $f^i$ is derived by composing f with itself i times. As a one-way function may not be a permutation, the inverse of f may not be defined; therefore, $f^{-i}(x)$ means any value y such that $f(y)=x$. By convention, f is a one-way function if, given $f^{-i}(x)$, it is hard to compute $f^{-(i+1)}(x)$.

Assume that n denotes the length of the message m ready to be signed. If the original message has been enriched with a data string and/or hashed, n will be the length after all prior operations. For simplicity, assume n is the product of two integers $n=k \cdot e$. At step 92, a sequence of randomly selected inputs $r_1, \ldots, r_{k+1}$ is generated as a one-time secret key. The method continues at step 94 using the one-time secret key and the one-way function f to generate the one-way public key as the sequence $s_1, \ldots, s_{k+1}$, where $$s_i = f^{2e}(r_i)$$

for $i=0, \ldots, k$ and $$s_{k+1} = f^{k \cdot 23}(r_{k+1}).$$

At step 96, a given message m to be one-time signed is seected. The signer then divides the message into k segments to obtain k e-bit strings $m_1, \ldots, m_k$. Each string is an integer between 0 and $2^e$. The one-time signature of m is then computed at step 100 by generating the sequence $\sigma_1, \ldots, \sigma_{k+1}$, where $$\Sigma_i = f^{-m_i}(S_i).$$

for $i=0, \ldots, k$ and $$\Sigma_{k+1} = f^{-(k \cdot 2e - (m_1 + \ldots + m_k))}(s_{k+1}).$$

To verify the signature, the signee computes:

for $i=1, \ldots, k$ and $$f^{k \cdot 2e - (m_1 + \ldots + m_k)}(\sigma_{k+1}),$$

and checks that the result equals the one-way public key.

The one-time signature scheme can be generalized into a broader scheme as follows. The method begins by selecting a predetermined one-way function f and generating k randomly-selected input strings as a one-time secret key, where the number of input strings k is less than the length n of the message m. Thereafter, the signer applies the one-way function f to the input strings of the one-time secret key to generate a one-time public key corresponding to the one-time secret key. To complete the scheme, the signer then applies the one-way function f to the input strings of the secret key a predetermined number of times x, where x is polynomial in n, to generate a one-time signature of the message relative to the one-time public key.

The one-time scheme described above is advantageous as seen by the number of f-evaluations required and the length of the signature it produces by the number of f-inputs. In particular, generating the one-time keys takes $2k \cdot 2^e$ f-evaluations, $2^e$ for each of the first k $r_i$'s and $k \cdot 2^e$ for the last one. Signing requires exactly $k \cdot 2^e$ evaluations. The signature has the same length of $K+1$ f-inputs, and the length of the secret key is $k+1$ f-inputs.

The above analysis of the efficiency of one-time signing refers to the case in which the one-time secret key is all that is remembered from the key-generation stage. However, storing intermediate values of the powers of f on the $r_i$'s in the key-generation state subsequently allows faster signing. For instance, if all intermediate values are stored, 0 f-evaluations are needed for signing: for any $m_i$, the proper value $f^{-m_i}(s_i) = f^{2e-m_i}(r_i)$ is retrieved from memory. If $2_k$ intermediate values are stored (the middle one for $r_i, \ldots r_k$, and k equally spaced ones for $s_{k+1}$) signing is twice as fast.

Because the one-time secret key consists of $k+1$ randomly chosen f-inputs, its length can be shortened by choosing the f-inputs pseudo-randomly rather than randomly. In particular, a Properly short random seed (string) z is chosen and then expanded in a secure and predetermined fashion to generate the f-inputs constituting the one-time secret key.

The one-time digital signature scheme of FIG. 4 simultaneously exhibits the following two properties:

(1) The length (in f-inputs) of the one-time signature of a message ready to be signed is shorter than the length (in binary) of the ready to be signed message itself, and (2) The number of f-evaluations is still polynomial in the length of the message ready to be signed.

Any scheme satisfying both properties is deemed a "well-compressing" one-time signature scheme. For example, another well-compressing one-time signature scheme can be obtained by computing $m_i = m$ mod for $p_i$ for $i = 1, \ldots, k$; where the $p_i$'s are relatively prime integers whose product is bigger than n. In this embodiment, the last f-input should be properly used as a "check sum".

As will be evident from the above description, the Present invention also describes a method to convert any ordinary signature scheme, which does not have the on-line/off-line property, into one having it. For example, any known digital signature scheme can be used in the off-line phase of the method to compute the signature $\Sigma$ of the one-time public key (of the one-time digital signature scheme). Thus, if the underlying scheme is fast, the off-line phase of the transformed scheme will be comparably as fast; however, the on-line phase will be much faster. The subject scheme also possesses an additional, novel property; it is secure against chosen plaintext attacks even if the underlying signature scheme is not. Indeed, in the preferred embodiment, a signature scheme totally unsafe against chosen plaintext attack is used. Because the disclosed scheme requires a small amount of overhead on top of the effort required by the underlying signature scheme, it may be used simply for strengthening a given signature scheme. In fact, the scheme may also be used once the underlying scheme has already been made on-line/off-line according to the invention.

It should be appreciated by those skilled in the art that the specific embodiments disclosed above may be readily utilized as a basis for modifying or designed other structures for carrying out the same purposes of the present invention. It should also be realized by those skilled in the art that such equivalent constructions do not depart from the spirit and scope of the invention as set forth in the appended claims.

We claim:

1. A method for enabling a single signer to generate a digital signature of a message using first and second digital signature schemes, each of the digital signature schemes having a key generation algorithm for generating a pair of matching public and secret keys, a signing algorithm which uses the pair of matching public and secret keys to produce a signature with respect to the public key, and a verification algorithm for determining whether the signature produced by the signing algorithm is valid with respect to the public key, comprising the steps of:

(a) computing a signature $\Sigma$ of the public key pk of the first digital signature scheme using the signing algorithm S of the second digital signature scheme; and (b) computing a signature $\sigma$ of the message using the signing algorithm s of the first digital signature scheme to generate a digital signature of the message, the digital signature comprising a data string $(\Sigma, \sigma)$.

2. The method for generating a digital signature as described in claim 1 further including the steps of enriching the message with a data string to create an enriched message and applying a predetermined differentiating function H to the enriched message prior to computing the signature $\sigma$.

3. The method for generating a digital signature as described in claim 2 wherein the predetermined differentiating function is the identity function.

4. The method for generating a digital signature as described in claim 2 wherein the predetermined differentiating function is a hashing function and the data string includes one or more of the following: the public key pk, a hashed version of the public key pk, a hashed version of the public key pk enriched with a data string, the signature $\Sigma$, data identifying the signer, data identifying the date of signing, other data or no data.

5. The method for generating a digital signature as described in claim 1 further including the step of enriching the public key with a data string to create an enriched public key prior to computing the signature $\Sigma$.

6. The method for generating a digital signature as described in claim 1 wherein the first digital signature scheme is a one-time scheme having a one-time key generation algorithm g, a one-time signing algorithm s and a one-time verification algorithm v.

7. A method for generating and verifying digital signatures using one or more one-time digital signature schemes and a second digital signature scheme, each of the digital signature schemes having a key generation algorithm for generating a pair of matching public and secret keys, a signing algorithm which uses the pair of matching public and secret keys to produce a signature with respect to the public key, and a verification algorithm for determining whether the signature produced by the signing algorithm is valid with respect to the public key, comprising the steps of:

(a) computing a signature $\Sigma$ of the public key pk of one of the one-time digital signature schemes using the signing algorithm S of the second digital signature scheme;

(b) storing a data string in a storage area, the data string comprising a pre-computed signature which includes the signature $\Sigma$ of the public key pk of the one-time digital signature scheme;

(c) selecting a message m to be signed;

(d) differentiating the message using a predetermined differentiating function H to generate a mapped message;

(e) computing a signature s of the mapped message using the signing algorithm s of the one-time digital signature scheme used in step (a); and (f) generating a data string (S,s) representing a signature of the message m.

8. The method for generating and verifying digital signatures as described in claim 7 further including the step of:
(g) steps (a)-(f) using a different one-time digital signature scheme for each message selected to be signed.

9. The method for generating and verifying digital signatures as described in claim 7 further including the steps of:
(h) using the verification algorithm V of the second digital signature scheme to determine whether the signature $\Sigma$ is the signature of the public key pk in the one-time digital signature scheme;
(i) if the signature $\Sigma$ is the signature of the public key pk, using the predetermined differentiating function to generate the mapped message; and
(j) using verification algorithm v of the one-time digital signature scheme used in step (a) to verify that the signature $\sigma$ is the one-time signature of the mapped message.

10. The method for generating and verifying digital signatures as described in claim 7 wherein the pre-computed signature includes the secret key sk of the one-time digital signature scheme.

11. A method for generating digital signatures using a one-time digital signature scheme and a second digital signature scheme, each of the digital signature schemes having a key generation algorithm for generating a pair of matching public and secret keys, a signing algorithm which uses the pair of matching public and secret keys to produce a signature with respect to the public key, and a verification algorithm for determining whether the signature produced by the signing algorithm is valid with respect to the public key, comprising the steps of:
(a) enriching the public key pk of the one-time signature scheme and using a predetermined differentiating function H' to map the enriched public key into a data string H'(pk);
(b) computing a signature $\Sigma$ of the data string H'(pk) using the signing algorithm S of the second digital signature scheme;
(c) selecting a message m to be signed;
(d) enriching the message and using a predetermined differentiating function H to map the enriched message and the data string H'(pk) into a data string H(m,H'(pk));
(e) computing a signature $\sigma$ of the data string H(m,H'(pk)) using the signing algorithm s of the one-time digital signature scheme; and
(f) generating a data string ($\Sigma,\sigma$) representing a signature of the message m.

12. A method for generating digital signatures as described in claim 11 further including the step of:
(g) repeating steps (a)-(f) using a different one-time digital signature scheme for each message selected to be signed.

13. A method for enhancing the security of a known digital signature scheme which may be subject to an adaptive chosen plaintext attack, the known digital signature scheme having a key generation algorithm G for generating a pair of matching public and secret keys (PK,SK), a signing algorithm S which uses the pair of matching public and secret keys to produce a signature with respect to the public key PK, and a verification algorithm V for determining whether the signature produced by the signing algorithm is valid with respect to the public key PK, comprising the steps of:
(a) running a key generation algorithm g of a one-time digital signature scheme to generate a one-time public key pk and its associated one-time secret key sk;
(b) computing a signature S of the public key pk of the one-time digital signature scheme using the signing algorithm S of the known digital signature scheme;
(c) storing a data string in a storage area, the data string comprising a pre-computed signature which includes the signature S of the public key pk of the one-time digital signature scheme;
(d) selecting a message m to be signed;
(e) differentiating the message using a predetermined differentiating function H to generate an enriched message;
(f) computing a signature s of the enriched message using the signing algorithm s of the one-time digital signature scheme; and
(g) generating a data string (S,s) representing a signature of the message m.

14. The method for enhancing the security of a known digital signature scheme as described in claim 13 wherein the known digital signature scheme is the Rivest, Shamir and Adleman (RSA) scheme.

15. A method for on-line/off-line digital signing, comprising the steps of:
(a) pre-computing a data string x from a pair of matching public and secret keys of a digital signature scheme such that, for any message m later selected to be signed, a signature of the message m derived from x can be computed substantially faster than the signature of the message m derived from the matching Public and secret keys;
(b) selecting a message m to be signed;
(c) computing a signature $\sigma$ of the message m using the data string x.

16. The method for on-line/off-line signing as described in claim 15 wherein steps (a) and (c) are carried out by the same signer.

17. The method for on-line/off-line signing as described in claim 16 wherein each data string includes a different Pair of matching public and secret keys.

18. The method for on-line/off-line signing as described in claim 15 wherein steps (a) and (c) are carried out by a different signer.

19. The method for on-line/off-line signing as described in claim 15 wherein step (a) is run to generate a new data string for each message m to be signed.

20. A method for generating a digital signature of a message using first and second digital signature schemes, each of the digital signature schemes having a key generation algorithm, a signing algorithm and a verification algorithm, comprising the steps of:
(a) running the key generation algorithm g of the first digital signature scheme to generate a plurality of public keys and their associated secret keys;
(b) computing a signature $\Sigma$ of the plurality of public keys of the first digital signature scheme using the signing algorithm S of the second digital signature scheme;
(c) storing a data string in a storage area, the data string comprising a pre-computed signature which includes the signature E of the plurality of public keys of the first digital signature scheme;
(d) selecting a message m to be signed;

(e) using a predetermined differentiating function H to map the message into a data string H(m);

(f) computing a signature $\sigma$ of the data string H(m) with respect to one of the public keys pk of the first digital signature scheme using the signing algorithm s of the first digital signature scheme; and (g) generating a data string $(\Sigma,\sigma)$ representing a signature of the message m.

21. The method for generating a digital signature as described in claim 20 wherein steps (d)-(g) are repeated using a different public key of the first digital signature scheme for each message to be signed.

22. The method for generating a digital signature as described in claim 20 further including the step of hashing the plurality of Public keys prior to comPuting the signature $\Sigma$.

23. The method for generating a digital signature as described in claim 22 wherein the data string includes the plurality of public keys to enable verification of the signature $\sigma$.

24. A method for generating a one-time digital signature of a message ready to be signed, the message having a length n, comprising the steps of:

(a) selecting a predetermined one-way function f which can be composed with itself;

(b) generating k randomly-selected input strings as a one-time secret key, where the number of input strings k is less than the length n of the message;

(c) applying the one-way function f to the input strings of the one-time secret key to generate a one-time public key corresponding to the one-time secret key; and (d) applying the one-way function f to the input strings of the secret key a predetermined number of times x, where x is polynomial in n, to generate a one-time signature of the message relative to the one-time public key.

25. The method for generating a one-time digital signature as described in claim 24 wherein the input strings of the one-time secret key are selected in psuedo-random manner.

26. A method for generating a one-time digital signature of a message ready to be signed, the message having a length n which is less than or equal to the product (ek) where e and k are integers, comprising the steps of:

(a) selecting a predetermined one-way function f which can be composed with itself;

(b) generating a sequence of randomly-selected inputs $r_1, \ldots, r_{k+1}$ as a one-time secret key;

(c) using the predetermined one-way function f and the one-time secret key to generate a sequence $s_1, \ldots, s_{k+1}$ as a one-time public key, where $$s_i = f^{2^e}(r_i)$$

for $i = 0, \ldots, k$ and $$s_{k+1} = f^{k \cdot 2^e}(r_{k+1});$$

(d) selecting a message m to be signed;

(e) dividing the message m into k segments to obtain k e-bit strings $m_1, \ldots, m_k$, each of the strings being an integer between 0 and $2^e$; and (f) generating a one-time signature of the message m comprising the sequence $\sigma_1, \ldots, \sigma_{k+1}$, where $$\sigma_i = f^{-m_i}(s_i)$$

for $i = 0, \ldots, k$ and $$\sigma_{k+1} = f^{-(k \cdot 2^e - (m_1 + \cdots + m_k))}(s_{k+1}).$$

27. A card for use in effecting transactions, comprising:

a body portion;

a memory within said body portion for storing a data string x pre-computed from a pair of matching public and secret keys of a digital signature scheme such that, for any message m later selected to be signed, a signature of the message m derived from x can be computed substantially faster than the signature of the message m derived from the matching public and secret keys; and means for computing a signature s of the message m using the data string x.

28. A card for use in effecting transactions, comprising:

a body portion;

a memory within said body portion for storing a signature $\Sigma$, the signature $\Sigma$ being the digital signature of a public key pk of a first digital signature scheme derived by a signing algorithm S of a second digital signature scheme; and means within the body portion for computing a signature $\sigma$ of a transaction data message using a signing algorithm s of the first digital signature scheme.

29. A system for allowing authorized users of transaction cards to effect transactions via at least one transaction terminal, comprising:

a plurality of said cards, each of the cards having a memory for storing a data string x pre-computed from a pair of matching public and secret keys of a digital signature scheme such that, for any message m later selected to be signed, a signature of the message m derived from x can be computed substantially faster than the signature of the message m derived from the matching public and secret keys, each card further including means for computing a signature s of the message m using the data string x; and at least one transaction terminal having means for communicating with the card and for receiving the signature s of the message m computed by the card.

30. The system for allowing authorized users of transaction cards to effect transactions as described in claim 29 wherein the transaction terminal further includes means for generating the message m.

31. A system for allowing authorized users of transaction cards to effect transactions via at least one transaction terminal, comprising:

a plurality of said transaction cards, each of the cards having stored therein a signature $\Sigma$ representing the digital sign of a public key pk of a first digital signature scheme derived by a signing algorithm S of a second digital signature scheme, each of the cards further including means for computing a signature $\sigma$ of a transaction data message using a signing algorithm s of the first digital signature scheme and means for storing a data string $(\Sigma,\sigma)$; and at least one transaction terminal having means for receiving a card inserted into the transaction terminal, means for communicating with the card inserted into the terminal and means for receiving the signature $\sigma$ of the message m computed by the card.

32. A terminal for loading data into transaction cards to be used with at least one transaction terminal, each card having a memory therein, comprising:

means for computing a data string x pre-computed from a pair of matching public and secret keys of a digital signature scheme such that, for any message m later selected to be signed, a signature of the message m derived from x can be computed substantially faster than the signature of the message m derived from the matching public and secret keys; and means for storing the data string x in the memory of an transaction card.

33. A terminal for loading data into transaction cards to be used with at least one transaction terminal, each card having a memory therein, comprising:

means for computing a signature $\Sigma$ of the public key pk of a first digital signature scheme using the signing algorithm S of a second digital signature scheme; and means for storing the signature $\Sigma$ in the memory of an transaction card.

* * * * *